United States Patent
Fournier

(10) Patent No.: US 12,398,059 B2
(45) Date of Patent: Aug. 26, 2025

(54) FOREHEARTH TANK ASSEMBLY FOR A GLASS DISTRIBUTION CHANNEL

(71) Applicant: SOCIETE EUROPEENNE DES PRODUITS REFRACTAIRES, Courbevoie (FR)

(72) Inventor: Patrice Fournier, Les Angles (FR)

(73) Assignee: SOCIETE EUROPEENNE DES PRODUITS REFRACTAIRES (FR)

( * ) Notice: Subject to any disclaimer, the term of this patent is extended or adjusted under 35 U.S.C. 154(b) by 654 days.

(21) Appl. No.: 17/601,700

(22) PCT Filed: Apr. 8, 2020

(86) PCT No.: PCT/EP2020/060091
§ 371 (c)(1),
(2) Date: Oct. 5, 2021

(87) PCT Pub. No.: WO2020/208107
PCT Pub. Date: Oct. 15, 2020

(65) Prior Publication Data
US 2022/0212975 A1    Jul. 7, 2022

(30) Foreign Application Priority Data
Apr. 11, 2019   (FR) ..................................... 1903865

(51) Int. Cl.
*C03B 7/088*      (2006.01)
*C03B 7/086*      (2006.01)

(52) U.S. Cl.
CPC .............. *C03B 7/088* (2013.01); *C03B 7/086* (2013.01)

(58) Field of Classification Search
CPC ...................................................... C03B 7/086
See application file for complete search history.

(56) References Cited

U.S. PATENT DOCUMENTS 1,537,962 A * 5/1925 O'Neill ................... C03B 7/086
                                                             65/332
1,631,061 A * 5/1927 Rankin .................... C03B 7/092
                                                             65/331
2006/0213226 A1    9/2006 Hartmann

FOREIGN PATENT DOCUMENTS

| DE | 102006000817 A1 | 7/2007 |
|----|-----------------|--------|
| EP | 1599424 A1      | 11/2005 |
| FR | 625493 A        | 8/1927 |
| NL | 6505096 A       | 10/1965 |

OTHER PUBLICATIONS

International Search Report corresponding to International Application No. PCT/EP2020/060091, dated Jul. 6, 2020, 5 pages.

* cited by examiner

*Primary Examiner* — Erin Snelting
(74) *Attorney, Agent, or Firm* — Ronald M. Kachmarik; Cooper Legal Group LLC

(57) ABSTRACT

Forehearth tank assembly for a glass distribution channel. The assembly includes a single liner, two plungers and more and a single flow washer that has first and second orifices. The plungers are arranged, at least in part, in the liner. More than three grooves are created on the inner surface of the liner. Each has, in an inner part of the liner that is intended to be in contact with molten glass, a lower portion extending over more than 10% of the length of the lower part and having a length, measured following the groove, of greater than 0.1 times the length of the lower part. The length of the lower part is measured along the axis of the liner.

12 Claims, 4 Drawing Sheets

[Fig 1]
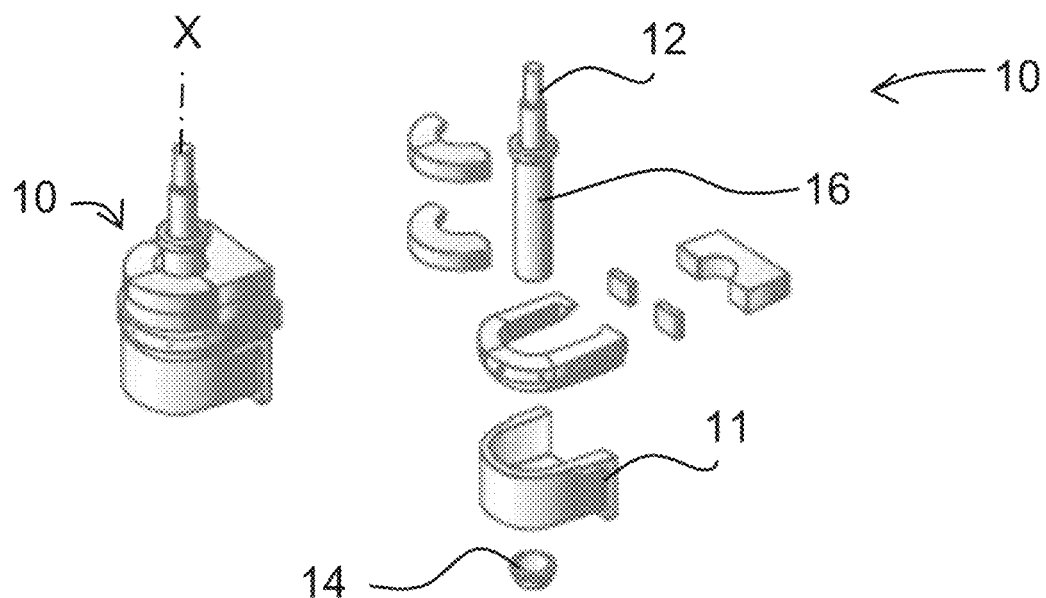
[Fig 2]
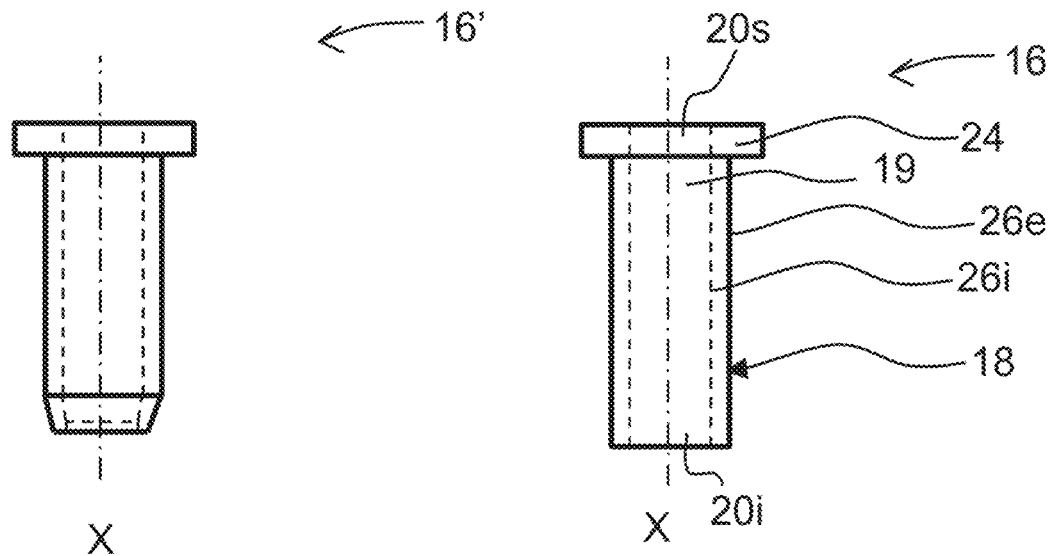

[Fig 3]
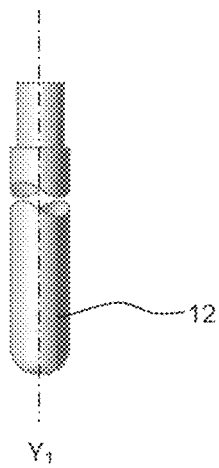
[Fig 4]
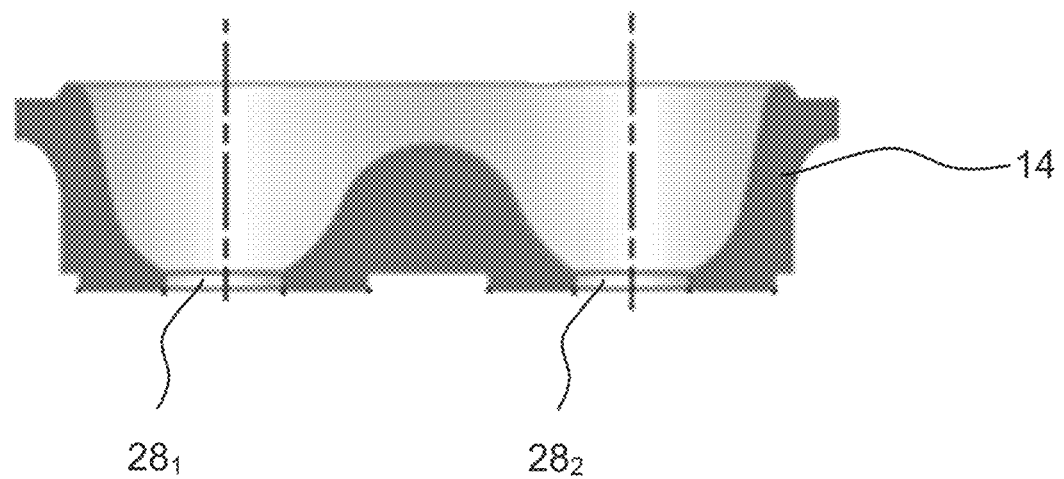

[Fig 5]
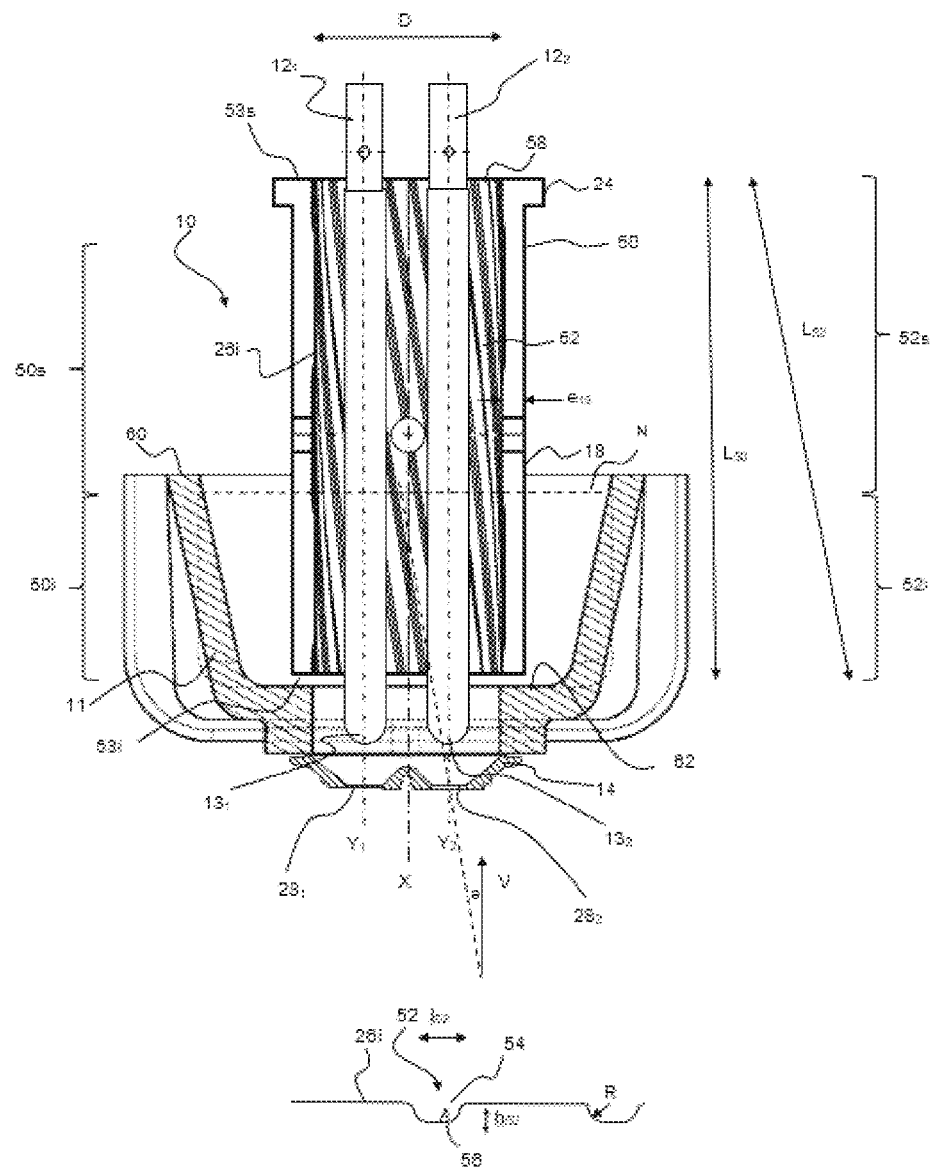

[Fig 6]
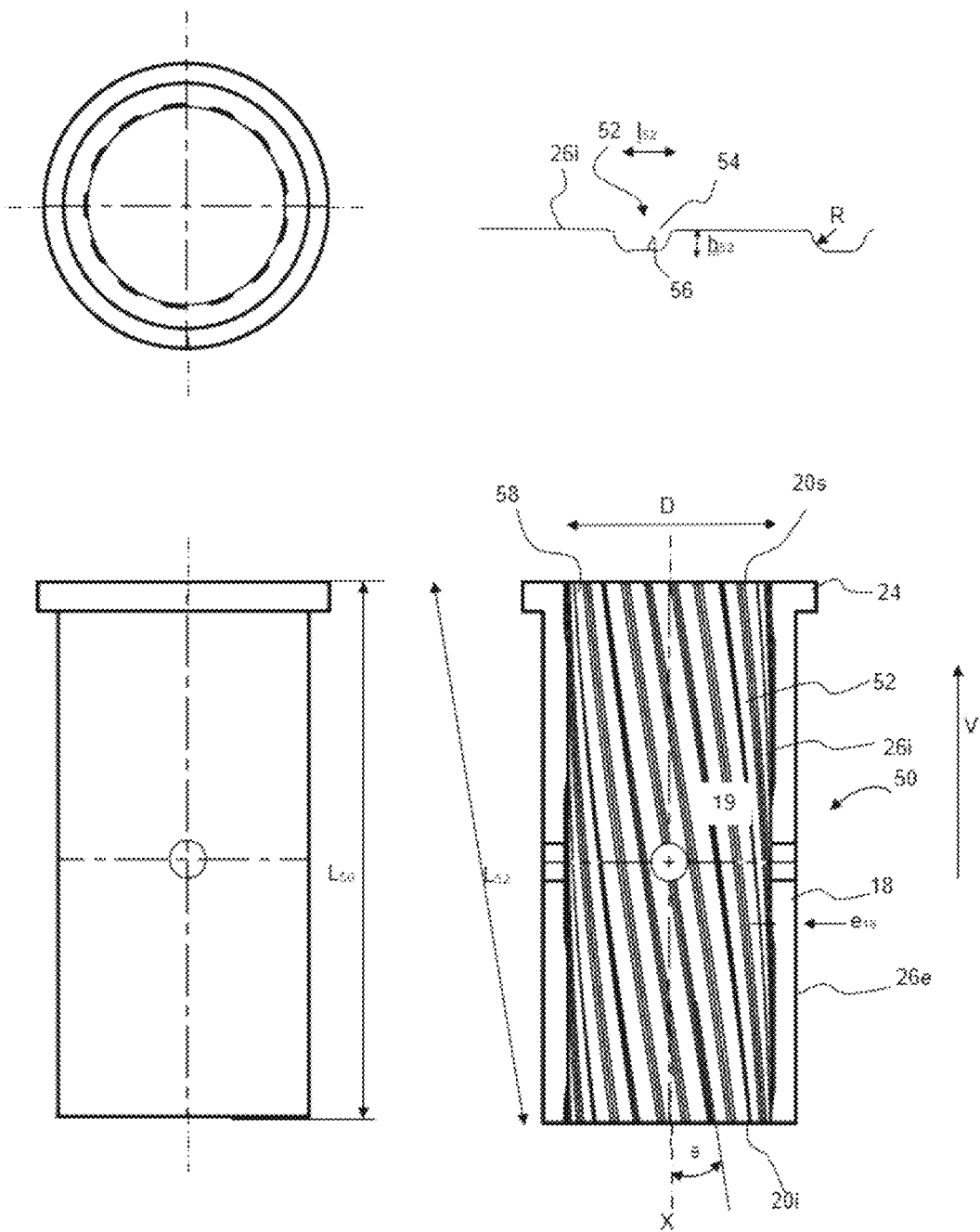

FOREHEARTH TANK ASSEMBLY FOR A GLASS DISTRIBUTION CHANNEL

TECHNICAL FIELD

The invention relates to a forehearth tank assembly of a glass distribution channel which is intended for the formation of gobs of molten glass.

PRIOR ART

In the production of glass articles such as bottles, beakers, bottles, generally referred to as hollow glass, a suitable composition is melted in a melting furnace in order to obtain molten glass. The molten glass is conveyed, via distribution channels ("feeders"), from the furnace to the molding machines which will shape the articles.

A distribution channel terminates with a forehearth tank assembly ("spout assembly" or "glass distribution channel end portion"). As illustrated schematically in FIG. 1, a forehearth tank assembly 10 conventionally comprises
- a forehearth tank 11 ("spout");
- a flow washer 14 ("orifice ring");
- a plunger 12 which has an upward and downward movement in order to retain or repel the molten glass via the flow washer 14 in order to form the gob,
- a liner 16 which is generally rotating and whose position in terms of height can be controlled, in particular in order to block the arrival of the molten glass as far as the flow washer in order to be able to replace it.

The gobs formed using the forehearth tank assembly are conventionally distributed as far as the molding machines using slides.

FIG. 2 schematically illustrates, in longitudinal section, two examples of conventional liners. The liner 16 of the right image, having an axis x, conventionally comprises
- a cylindrical sleeve 18, having an axis X which is conventionally vertical and which has a circular cross section and whose aperture 19 opens at the upper and lower ends thereof via an upper opening 20s and lower opening 20i, respectively, and
- at the upper end of the sleeve, a transverse edge 24.

The sleeve 18 is externally defined by a radially outer lateral surface 26e and internally defined by a radially inner lateral surface 26i.

The lower end of the sleeve may be beveled as in the liner 16' of the embodiment of the left image of FIG. 2 which is generally referred to as a liner for so-called "Metering System" technology.

The aperture 19 of the sleeve enables vertical sliding of a plunger 12, such as the one illustrated in FIG. 3. The plunger having an axis $Y_1$ may have a body of cylindrical form, which is generally formed by means of revolution or conical. The lower end of the plunger may in particular be in the form of a half-sphere or be flat.

FIG. 4 is a schematic sectioned illustration of a flow washer 14 with two holes $28_1$ et $28_2$.

The liner is a critical element. In particular, a breakage of the liner involves a long period of stoppage in order to repair the production line.

There is a permanent requirement to increase the period of time between two liner replacements.

An object of the invention is to at least partially meet this requirement.

EP 1 599 424 (or US 2006/0213226) describes a forehearth tank assembly of a glass distribution channel. Two plungers are arranged in the liner. The inner surface of the liner does not comprise protuberances FR 625 493 and NL 6 505 096 each describe a forehearth tank assembly which comprises only a single plunger and only a single outlet hole.

DESCRIPTION OF THE INVENTION

Statement of Invention

The invention thus relates to a forehearth tank assembly of a glass distribution channel, the assembly comprising a single liner, referred to as a "grooved liner", at least two plungers, and a single flow washer, the plungers being arranged at least partially in the liner, more than three grooves being provided in the inner surface of the liner and each comprising, in a lower portion of the liner which is intended to be in contact with molten glass, a lower portion which extends over more than 10% of the length of the lower portion and which has a length, measured along the groove, greater than 0.1 times and preferably less than two times the length of the lower portion, the length of the lower portion being measured along the axis (X) of the liner.

This is because the inventors have found, completely by accident, that such grooves unexpectedly enable the service-life of the liner to be increased, and therefore enable the period of time before it is replaced to be increased.

The invention also relates to a grooved liner which is shaped for a forehearth tank assembly according to the invention. In an embodiment, the inner diameter D of the liner is greater than 12 cm.

In a forehearth tank assembly according to the invention or independently of such an assembly, a grooved liner may further comprise one or more of the following optional features:
- the lower portion of the liner extends over more than 15%, preferably over more than 20%, preferably over more than 25%, and/or over less than 70%, preferably over less than 65%, preferably over less than 60% of the length of the liner;
- the lower portion of a groove, preferably any groove, extends over more than 20%, preferably more than 30%, preferably more than 40%, preferably more than 50%, preferably more than 70%, preferably more than 80%, preferably more than 90%, preferably substantially 100% of the length of the lower portion of the liner;
- the lower portion of a groove, preferably any groove, has a length measured along the groove less than two times, preferably less than 1.8 times, preferably less than 1.6 times, preferably less than 1.4 times the length of the lower portion of the liner, and/or greater than 0.1 times, preferably greater than 0.2 times, preferably greater than 0.3 times, preferably greater than 0.4 times, preferably greater than 0.5 times, preferably greater than 0.7 times, preferably greater than 0.8 times, preferably greater than 0.9 times, preferably greater than 1.0 times, or greater than 1.1 times the length of the lower portion of the liner;
- a groove, preferably any groove, extends over more than 2%, preferably over more than 4%, preferably over more than 6%, preferably over more than 8%, preferably over more than 10%, preferably over more than 15%, preferably over more than 20%, preferably over more than 25%, preferably over more than 30%, preferably over more than 35%, preferably over more than 40%, preferably over more than 45%, preferably over more than 50%, preferably over more than 55%, preferably over more than 60%, preferably over more than 65%, preferably over more than 70%, preferably over more than 75%, preferably over more than 80%, preferably over more than 85%, preferably over more than 90%, preferably over more than 95%, preferably over substantially 100% of the length of the liner;

a groove, preferably any groove, has a length, measured along the groove, less than 2 times, preferably less than 1.8 times, preferably less than 1.6 times, preferably less than 1.4 times the length of the liner, and/or preferably greater than 0.02 times, preferably greater than 0.04 times, preferably greater than 0.06 times, preferably greater than 0.08 times, preferably greater than 0.1 times, preferably greater than 0.15 times, preferably greater than 0.2 times, preferably greater than 0.25 times, preferably greater than 0.3 times, preferably greater than 0.35 times, preferably greater than 0.4 times, preferably greater than 0.45 times, preferably greater than 0.5 times, preferably greater than 0.55 times, preferably greater than 0.6 times, preferably greater than 0.65 times, preferably greater than 0.7 times, preferably greater than 0.75 times, preferably greater than 0.8 times, preferably greater than 0.85 times, preferably greater than 0.9 times, preferably greater than 0.95 times, preferably greater than 1 times the length of the liner;

the number of grooves on the inner surface is less than or equal to (0.057*D+4.05) and greater than or equal to (0.048*D−2.43), D being the diameter of the upper opening of the liner, in mm;

the number of grooves is preferably greater than or equal to 8, or greater than 10, or greater than 12, or greater than 15;

the minimum depth of each groove is greater than 2 mm, preferably greater than 3 mm, preferably greater than 4 mm and/or less than 10 mm, preferably less than 9 mm, preferably less than 8 mm, preferably less than 7 mm, at least in the lower portion of the liner, preferably over the entire length of the groove;

the difference between the maximum depth and the minimum depth of any groove is less than 4 mm, preferably less than 3 mm, preferably less than 1 mm, at least in the lower portion of the liner, preferably over the entire length of the groove;

the depth of each of the grooves is constant, at least in the lower portion of the liner, preferably over the entire length of the groove;

the maximum width of a groove, preferably of any groove, is greater than 10 mm, preferably greater than 15 mm and/or less than 30 mm, preferably less than 25 mm, at least in the lower portion of the liner, preferably over the entire length of the groove;

the mean width of a groove, preferably any groove, is greater than 10 mm, preferably greater than 15 mm and/or less than 30 mm, preferably less than 25 mm, at least in the lower portion of the liner, preferably over the entire length of the groove;

the difference between the minimum width and the maximum width of a groove, preferably any groove, is less than 5 mm, preferably less than 4 mm, preferably less than 2 mm, at least in the lower portion of the liner, preferably over the entire length of the groove;

preferably, all the grooves have substantially the same width, at least in the lower portion of the liner, preferably over the entire length of the groove;

all the grooves have an identical shape;

the grooves extend substantially parallel with each other;

in an embodiment, the direction of a groove at any point of the groove forms, with the axis of the liner, an angle θ less than 10°, less than 5°, preferably less than 2°, at least in the lower portion of the liner, preferably over the entire length of the groove;

in an embodiment, the direction of a groove at any point of the groove forms, with the axis of the liner, an angle θ greater than 5°, preferably greater than 6°, preferably greater than 7° and/or less than 30°, preferably less than 28°, preferably less than 26°, preferably less than 25°, at least in the lower portion of the liner, preferably over the entire length of the groove;

the liner comprises a collar at an upper end, and/or has a conical outer shape at a lower end;

the liner is of a sintered or molten material, preferably sintered;

the inner surface of the liner has a generally cylindrical shape (that is to say, disregarding the grooves), preferably with a circular cross section;

the liner can be moved in terms of translation, preferably in terms of vertical translation;

the liner is made of ceramic material.

A forehearth tank assembly according to the invention may also comprise one or more of the following optional features:

the number of plungers is greater than or equal to 3 and/or less than or equal to 4;

in an embodiment, the number of plungers is equal to 2;

the flow washer has a number of holes equal to the number of plungers. In this embodiment, the lower end of each plunger faces a hole of the respective flow washer;

in an embodiment, the forehearth tank assembly comprises first and second plungers, and the lower end of the first and second plungers faces the first and second holes of the flow washer, respectively, preferably the first and second plungers are arranged coaxially relative to the first and second holes of the flow washer, respectively.

The invention also relates to a furnace for producing hollow glass articles, in particular made from soda-lime, borosilicate, fluorine opal or crystal glass, the furnace comprising a grooved liner according to the invention and/or a forehearth tank assembly according to the invention.

In a forehearth tank assembly according to the invention, the level of the molten glass defines the limit between the lower and upper portions of the liner, and therefore between the lower and upper portions of each groove.

The glass articles produced may in particular be bottles, glasses, pots and more generally any receptacle which is capable of containing a liquid, a cream or a paste.

The invention further relates to a method for producing a liner of a forehearth tank assembly according to the invention, in which method, in order to increase the service-life of the liner, there is provided, on the inner surface of the liner, more than three grooves which each comprise, in a lower portion of the liner which is intended to be in contact with the molten glass, a lower portion which extends over more than 10% of the length of the lower portion and which has a length, measured along the groove, greater than 0.1 times and preferably less than two times the length of the lower portion, the length of the lower portion being measured along the axis (X) of the liner.

Definitions

Unless indicated otherwise, the length of a groove is the length thereof measured along the curve of the groove.

The length of the liner is measured along the axis X thereof, between the lower and upper ends thereof. The same applies to the lower portion of the liner.

A groove "extends" over more than x % of the length of the liner when the length of the groove, measured along the axis X, is greater than x % of the length of the liner.

The angle between two directions is the angle between two planes perpendicular to these two directions, respectively.

A plunger is "arranged in a liner" when, during operation, it cooperates with this liner for the formation of gobs.

In the present description, the adjectives "lower", "upper", horizontal", "vertical", etcetera, are defined relative to the operating position, as illustrated in the Figures, where V is the vertical direction.

Unless indicated otherwise, "comprise", "include" or "have" must be interpreted in a broad, non-limiting manner.

BRIEF DESCRIPTION OF THE DRAWINGS

Other features and advantages of the invention will be appreciated from a reading of the following detailed description and examination of the appended drawings, in which:

FIG. 1, described in the preamble, schematically illustrates a conventional forehearth tank assembly in an assembled state in the left image and as an exploded view in the right image;

FIG. 2 is a schematic longitudinal section of two examples of conventional liners;

FIG. 3 is a schematic front view of an example of a plunger with a round end;

FIG. 4 is a schematic longitudinal section of an example of a flow washer with two holes;

FIG. 5 is a schematic longitudinal section, in an operating position, of an example of a forehearth tank assembly according to the invention, in a preferred embodiment, the lower right image being a schematic cross section of two grooves;

FIG. 6 is a schematic front view (lower left image), in longitudinal section (lower right image) and bottom view (upper left image), of the grooved liner of the forehearth tank assembly of FIG. 5. The upper right image is a schematic cross section of two grooves.

Identical reference numerals are used to refer to identical or similar members.

DETAILED DESCRIPTION

Liner

FIGS. 1 to 4 having been described in the preamble, reference may be made to FIG. 5.

This Figure illustrates a forehearth tank assembly 10 comprising
- a forehearth tank 11;
- a flow washer 14 which comprises first and second holes $28_1$ and $28_2$;
- first and second plungers $12_1$ and $12_2$, having vertical axes $Y_1$ and $Y_2$ respectively, which have first and second lower ends $13_1$ and $13_2$, respectively, which face the first and second holes $28_1$ and $28_2$, respectively;
- a grooved liner 50 according to the invention in a preferred embodiment.

The liner 50 conventionally comprises
- a cylindrical sleeve 18 having an axis X which is conventionally vertical and which preferably has a circular cross section and whose aperture 19 opens at the upper and lower ends thereof via an upper opening 20s and a lower opening 20i, respectively, and
- at the upper end of the sleeve, a transverse edge 24, or "collar".

The sleeve 18 is defined externally by a radially outer lateral surface, or "outer surface" 26e, and internally by a radially inner lateral surface, or "inner surface" 26i. The lower end of the sleeve may be beveled.

During operation, only a portion of the liner 50, referred to as the "lower portion" 50i, is in contact with the molten glass. The upper portion of the liner 50s does not come into contact with the molten glass. The level N of the molten glass, illustrated with dashed lines in FIG. 5, is defined by the nominal conditions of use of the forehearth tank assembly defined beforehand. The limit between the lower and upper portions of the liner is therefore clear to the person skilled in the art. It is dependent in particular on the forehearth tank model and in particular on the height thereof. Under nominal conditions of use, the level of molten glass is generally between 2.5 and 4 cm below the upper face 60 of the forehearth tank, and the lower edge 53i of the liner is generally from 1.5 to 2.5 cm above the base 62 of the forehearth tank.

The lower portion of the liner typically extends over more than 15%, preferably more than 20%, preferably more than 25% and less than 70%, preferably less than 65%, preferably less than 60% of the length of the liner.

The sleeve 18 preferably has a thickness $e_{18}$ greater than 18 mm and less than 40 mm, preferably less than 35 mm, preferably less than 27 mm.

According to the invention, the inner surface 26i comprises a plurality of grooves 52.

A groove 52, preferably any groove 52, is in the form of a regular helix. The tangent at any point of the helix forms a constant angle θ with a vertical straight line which extends via this point. The angle θ is preferably greater than 5°, preferably greater than 6°, preferably greater than 7° and/or less than 30°, preferably less than 28°, preferably less than 26°, preferably less than 25°. In the Figure, it is 9°.

Preferably, a groove 52, preferably any groove 52, extends over less than 0.8 of a revolution, preferably less than 0.5 of a revolution, preferably less than 0.4 of a revolution about the axis X.

A groove 52, preferably any groove 52 extends over more than 2%, preferably over more than 4%, preferably over more than 6%, preferably over more than 8%, preferably over more than 10%, preferably over more than 15%, preferably over more than 20%, preferably over more than 25%, preferably over more than 30%, preferably over more than 35%, preferably over more than 40%, preferably over more than 45%, preferably over more than 50%, preferably over more than 55%, preferably over more than 60%, preferably over more than 65%, preferably over more than 70%, preferably over more than 75%, preferably over more than 80%, preferably over more than 85%, preferably over more than 90%, preferably over more than 95%, preferably over substantially 100% (as in FIG. 5) of the length $L_{50}$ of the liner, measured along the axis X.

Each groove 52 comprises, in the lower portion of the liner, a lower portion 52i which is intended, during operation, to come into contact with molten glass and which may comprise, in the upper portion of the liner, a complementary upper portion 52s which extends the lower portion towards the upper side of the liner 50.

Preferably, the depth, or "height" $h_{52}$, of the lower portion of a groove 52, preferably any groove 52, is constant. Preferably, it is greater than 2 mm, preferably greater than 3 mm, preferably greater than 4 mm and/or less than 10 mm, preferably less than 9 mm, preferably less than 8 mm, preferably less than 7 mm. Preferably, the width 152 of a groove 52, measured at the opening thereof which is preferably constant, is greater than 10 mm, preferably greater than 15 mm and/or less than 30 mm, preferably less than 25 mm.

Preferably, the lower portion of a groove 52 is shallow with respect to the width thereof. Preferably, the ratio $h_{52}/l_{52}$ of the lower portion of a groove 52, preferably any groove 52, is less than 0.5, preferably less than 0.4, preferably less than 0.3 and/or greater than 0.1, preferably greater than 0.2.

The transverse profile of the lower portion of a groove 52, preferably any groove 52, that is to say, in a plane of section perpendicular to the axis thereof, as in the lower right image of FIG. 5, is preferably symmetrical. Preferably, the profile is convergent from the opening 54 of the groove up to the base 56 thereof. The absence of an undercut advantageously facilitates the demolding of the liner when it is produced. Preferably, the profile has no edges or corners. Preferably, the minimum radius of curvature R is greater than 3 mm, preferably greater than 4 mm.

The width and/or the depth and/or the profile of the upper portion 52s of a groove, preferably any groove, are preferably identical to those of the lower portion 52i which it extends (when such an upper portion 52s is present).

Preferably, a groove 52, preferably any groove 52, opens at the lower edge 53i, and, more preferably, at the upper edge 53s of the liner 50. The production of the liner is thus facilitated.

The density of the grooves is preferably high. Preferably, the ratio of the total surface-area of the openings of the grooves to the surface-area of the inner surface 26i is greater than 20%, preferably greater than 30%, or greater than 35%, and/or less than 70%, preferably less than 70%, preferably less than 60%, preferably less than 50%, or less than 40%.

The number of grooves on the inner surface is preferably less than or equal to (0.057*D+4.05) and/or greater than or equal to (0.048*D−2.43), D being the diameter of the upper opening 58 of the liner, in mm.

For example, a liner which has a diameter D equal to 254 mm preferably comprises at least 0.048*254−2.43=9.762, or at least 10 grooves and preferably less than 0.057*254+ 4.05=18.528, or 18 grooves or less.

The number of grooves 52 is preferably greater than or equal to 8, or greater than 10, or greater than 12, or greater than 15 and/or less than 30, preferably less than 25.

Preferably, the grooves 52 are regularly distributed over the inner surface 26i.

The depth and/or the width and/or the length $L_{52}$ of a groove may be identical to or different from those of the other grooves.

Preferably, all the grooves 52 are identical.

Preferably, all the grooves 52 extend parallel with each other.

Conventional techniques may be used to produce a grooved liner.

The liner is preferably made from a ceramic material, optionally at least partially covered with a coating, preferably of platinum.

The liner preferably comprises more than 95%, preferably more than 98%, preferably more than 99%, preferably substantially 100% of oxides based on the mass of the liner.

The liner preferably has a composition such that the total content $Al_2O_3+ZrO_2+SiO_2+CaO$ is greater than 90%, preferably greater than 95%, preferably greater than 98%, preferably greater than 99%, in percentage by mass based on the oxides.

In a first specific embodiment, the liner has a total content $Al_2O_3+SiO_2+CaO$ greater than 90%, preferably greater than 95%, preferably greater than 98%, preferably greater than 99%, in percentage by mass based on the oxides. In the first embodiment, the $Al_2O_3$ content is preferably greater than 80%, preferably greater than 85%, preferably greater than 90%, in percentage by mass based on the oxides.

In a second specific embodiment, the liner has a total content $Al_2O_3+ZrO_2+SiO_2+CaO$ greater than 90%, preferably greater than 95%, preferably greater than 98%, preferably greater than 99%, in percentage by mass based on the oxides. The liner may in particular have the following composition, based on the mass of the oxides and for a total of 100%:

$Al_2O_3$<85%, or $Al_2O_3$<80% and preferably $Al_2O_3$>45%, or $Al_2O_3$>50%, or $Al_2O_3$>60%, $SiO_2$<25%, or $SiO_2$<20% and preferably $SiO_2$>5%, or $SiO_2$>10%, $ZrO_2$<45%, or $ZrO_2$<35%, or $ZrO_2$<30%, or $ZrO_2$<25%, or $ZrO_2$<21%, or $ZrO_2$<17%, or $ZrO_2$<13%, and preferably $ZrO_2$>8%, or $ZrO_2$>10%, CaO<5%, preferably CaO<4%, preferably CaO<3%, preferably CaO<2% and, other oxides <5%, preferably <3%.

The liner is preferably shaped by means of casting from a material which can be molded in a mold.

The material which can be molded may be a molten liquid, the cooling leading to a liner made of molten material.

Alternatively, the material which can be molded may be a slip or a concrete, the hardening being able to result from the action of the mold, for example, of plaster, and/or the compound which brings about the setting in order to obtain a raw liner. Preferably, the raw liner is sintered prior to being used. The raw liner may also be sintered in situ during its use.

Preferably, the grooves are provided by the shape of the mold. Alternatively, they may be machined in a component obtained after molding or after hardening.

During operation, in an embodiment, the grooved liner rotates about the axis X thereof.

EXAMPLES

The following non-limiting examples are given in order to illustrate the invention.

Forehearth tank assemblies are produced and each comprise a forehearth tank in accordance with the reference 503-5080, two plungers in accordance with the reference 501-6313, a flow washer in accordance with the reference 503-5742 and:

a liner in accordance with the reference 503-5741 for the forehearth tank assembly of the comparative example 1, a liner in accordance with the reference 503-5741, on the inner surface of which there are provided 14 identical grooves having a width equal to 20 mm and having a width equal to 5 mm, inclined by an angle θ equal to 9° relative to the axis X, and extending over the entire length of the liner, the profile of the grooves having a minimum radius of curvature of 5 mm, for the forehearth tank assembly of the example 2 according to the invention, the references being defined in the catalogue of consumable products SEFPRO.

FIG. 6 shows a plan of this last grooved liner.

In each of the forehearth tank assemblies, the forehearth tank, the plungers, the flow washer and the liner are made of a sintered material which comprises 75.5% $Al_2O_3$, 12.5% $SiO_2$ and 10.5% $ZrO_2$.

In each of the forehearth tank assembles, the length of the lower portion of the liner is equal to 225 mm.

The forehearth tank assembles are used under the following conditions:
- the liner rotates at a speed equal to 2.5 rpm,
- the mean temperature of the glass on entering the forehearth tank assembly is equal to 1160° C.,
- the glass is a soda-lime glass,
- the quantity of glass passing via the flow washer is equal to 115 T/j.

The following table 1 summarizes the results obtained.

TABLE 1

|  | Comparative example 1 | Example according to the invention 2 |
|---|---|---|
| Service-life of the liner | 7 months | 14 months |

These tests show that the provision of grooves on the inner surface of the liner enables the service-life of the liner to be doubled. It changes from 7 months to 14 months.

The duration between two liner replacements may be increased as a consequence.

As can be seen clearly, the invention therefore provides a solution to limit considerably the replacement frequency of the liners.

Of course, the invention is not limited to the embodiments described and depicted and which are provided purely for the purposes of illustration.

In particular, the liner may be configured to receive more than two plungers. It may comprise relief variations, and in particular grooves on the outer surface thereof and/or one or more radial holes.

The invention claimed is:

1. A forehearth tank assembly of a glass distribution channel, the assembly comprising a single liner having a length and extending along an axis, at least two plungers, and a single flow washer comprising first and second holes, the plungers being arranged at least partially in the liner, more than three grooves being provided in an inner surface of the liner and each comprising, in a lower part of the liner which is intended to be in contact with molten glass, a lower portion which extends over more than 10% of a length of the lower part and which has a length, measured along the groove, greater than 0.1 times the length of the lower part, the length of the lower part being measured along the axis of the liner,
    a minimum depth of each groove being greater than 2 mm and less than 10 mm, at least in the lower part of the liner,
    a maximum width of each groove being greater than 10 mm and less than 30 mm, at least in the lower part of the liner.

2. The forehearth tank assembly as claimed in claim 1, wherein the liner has an upper opening and the number of grooves on the inner surface is less than or equal to 0.057*D+4.05 and greater than or equal to 0.048*D−2.43, D being a diameter of the upper opening of the liner in mm.

3. The forehearth tank assembly as claimed in claim 1, wherein the lower portion of at least one of said grooves extends over more than 90% of the length of the lower part of the liner.

4. The forehearth tank assembly as claimed in claim 1, wherein at least one of said grooves extends over more than 2% of the length of the liner.

5. The forehearth tank assembly as claimed in claim 1, wherein at least one of said grooves extends over more than 95% of the length of the liner.

6. The forehearth tank assembly as claimed in claim 1, wherein at least one of said grooves extends along a direction and said direction at any point of the groove forms, with the axis of the liner, an angle less than 30°.

7. The forehearth tank assembly as claimed in claim 1, wherein the number of said grooves is greater than 8.

8. The forehearth tank assembly as claimed in claim 1, wherein the difference between a maximum depth and the minimum depth of any said groove is less than 4 mm, and/or
    a mean width of any said groove is greater than 10 mm and less than 30 mm, and/or
    the ratio of a depth to a width of at least one of said grooves is less than 0.5, and/or
    each said groove having an opening, the ratio of a total surface-area of the openings of said more than three grooves to a surface-area of the inner surface is greater than 20% and less than 70%.

9. The forehearth tank assembly as claimed in claim 1, wherein said liner has an inner diameter greater than 12 cm.

10. A furnace for producing hollow glass articles, the furnace comprising a forehearth tank assembly as claimed in claim 1.

11. A method for maintaining a forehearth tank assembly of a glass distribution channel, the assembly comprising a single liner having a length and extending along an axis, at least two plungers, and a single flow washer comprising first and second holes, the plungers being arranged at least partially in the liner,
    said method comprising:
        after a period of use of said single liner, replacing said single liner by a grooved liner,
        more than three grooves being provided in an inner surface of the grooved liner and each comprising, in a lower part of the grooved liner which is intended to be in contact with molten glass, a lower portion which extends over more than 10% of a length of the lower part and which has a length, measured along the groove, greater than 0.1 times the length of the lower part, the length of the lower part being measured along the axis of the grooved liner,
    a minimum depth of each groove being greater than 2 mm and less than 10 mm, at least in the lower part of the grooved liner,
    a maximum width of each groove being greater than 10 mm and less than 30 mm, at least in the lower part of the grooved liner;
        using said grooved liner during a period of use greater than the period of time of said single liner.

12. A method for running a forehearth tank assembly of a glass distribution channel, said method comprising the following steps:
    providing the assembly with a single liner having a length and extending along an axis, at least two plungers, and a single flow washer comprising first and second holes, the plungers being arranged at least partially in the liner, more than three grooves being provided in an inner surface of the liner and each comprising, in a lower part of the liner which is intended to be in contact with molten glass, a lower portion which extends over more than 10% of a length of the lower part and which has a length, measured along the groove, greater than 0.1 times the length of the lower part, the length of the lower part being measured along the axis of the liner, a minimum depth of each groove being greater than 2 mm and less than 10 mm, at least in the lower part of the liner, a maximum width of each groove being greater than 10 mm and less than 30 mm, at least in the lower part of the liner;

running said assembly so as to use said liner for a period of use greater than 7 months.

* * * * *